United States Patent [19]
Müller

[11] Patent Number: 5,904,416
[45] Date of Patent: May 18, 1999

[54] ARRANGEMENT FOR MOUNTING A VEHICLE HEADLIGHT OR LAMP

[75] Inventor: Michael Müller, Gifhorn, Germany

[73] Assignee: Volkswagen AG, Wolfsburg, Germany

[21] Appl. No.: 08/956,719

[22] Filed: Oct. 23, 1997

[30] Foreign Application Priority Data

Oct. 23, 1996 [DE] Germany ............................ 196 43 768
Jun. 25, 1997 [DE] Germany ............................ 197 27 005

[51] Int. Cl.⁶ ...................................................... B60Q 1/02
[52] U.S. Cl. ........................... 362/288; 362/505; 362/506
[58] Field of Search ................................. 362/80, 82, 83, 362/83.3, 430, 418, 288, 369, 390, 496, 505, 506, 549

[56] References Cited

U.S. PATENT DOCUMENTS

| 2,781,443 | 2/1957 | Cargle | 362/80 |
| 4,325,105 | 4/1982 | Scimonelli | 362/80 |
| 4,488,206 | 12/1984 | Mizusawa | 362/83 |
| 4,679,125 | 7/1987 | Dick | 362/80 |
| 4,703,400 | 10/1987 | Vescio et al. | 362/369 |

FOREIGN PATENT DOCUMENTS 4321389 12/1995 Germany .

*Primary Examiner*—Y. Quach
*Attorney, Agent, or Firm*—Baker & Botts, L.L.P.

[57] ABSTRACT

An arrangement for attaching a headlight or a lamp to one or more vehicle parts in which the headlight or lamp is retained in an opening formed by at least two body parts by spring forces acting between the vehicle parts and the body parts forming the opening and/or by catch elements, making it possible to fasten a headlight or a lamp in an opening formed by two body parts, thus compensating differential heat expansions due to different materials of which the body parts are made.

12 Claims, 3 Drawing Sheets

5,904,416

ARRANGEMENT FOR MOUNTING A VEHICLE HEADLIGHT OR LAMP

BACKGROUND OF INVENTION

This invention relates to arrangements for mounting a headlight or a lamp on one or more vehicle parts, the headlight or lamp being retainable in an opening formed by at least two body parts.

If a headlight or a lamp, hereinafter called simply a lamp, is sealingly arranged in an opening formed by two or more vehicle body parts, and is attached to one or more other vehicle parts, then it is possible that the lamp will not be sealingly retained in the opening if there are different deformations of the vehicle parts. This is a particular problem if the vehicle parts are made of materials which are deformed differently by stress and/or heat.

It is also possible that the mounting for the lamp may be damaged upon deformation of a vehicle part, so that the fastening arrangement will no longer occupy its original position after reduction of a deformation, as for example upon cooling. This could produce a gap between the lamp and a body part after deformation.

German Patent No. 43 21 389 disclose a fastening arrangement for a light strip comprising a lamp and a mask in which heat expansions are compensated and thermal stresses thereby avoided. The heat expansions are compensated by providing for lengthwise displaceability of the connection between the lamp and the mask. With this arrangement heat expansion of the light strip itself is primarily compensated. There is no arrangement for compensating differential heat expansions of adjacent body parts or of vehicle parts made of different materials.

SUMMARY OF THE INVENTION

Accordingly, it is an object of the present invention to provide an arrangement for mounting a vehicle lamp which overcomes the above-mentioned disadvantages of the prior art.

Another object of the invention is to provide a mounting arrangement for a lamp which is positioned in an opening formed by at least two vehicle body parts so that differential deformations such as, for example, differential heat expansions of different materials, do not affect the seating of the lamp in the opening.

These and other objects of the invention are attained by providing a lamp mounting in which a lamp is retained in an opening by a spring arrangement similar to a floating attachment between the opening and the vehicle parts. The spring arrangement providing the spring action may yield to deformations of a vehicle body part to a certain extent and still exert the necessary retaining force on the lamp. In this way, the lamp is retained tightly in the opening even with changes in the spacing from the vehicle body parts to the points of attachment of the lamp to the vehicle part. Following a reverse deformation of the vehicle body parts to their original position, the lamp will still be retained tightly in the opening of the vehicle body parts by the spring arrangement.

According to another embodiment, ratchet elements are associated with the lamp and the lamp overlaps the edges of the vehicle body parts at least segmentally, and the ratchet elements grasp the body part edges from the inside of the vehicle so that the lamp edges are retained in a clamping manner between the ratchet elements and the lamp. Thus, the lamp is held directly against the vehicle body parts, and is in a position to follow changes in position of the vehicle body parts due to deformation so that any resulting gaps between the body parts and the lamp are minimized.

A further reduction in any gap width may be achieved by combining the two embodiments, i.e., by providing a spring arrangement for retaining the lamp on the vehicle parts forming the opening in addition to the ratchet elements retaining the lamp in the edges of the body parts around the opening.

In addition, improved sealing is obtained by providing a sealing element between the lamp and the vehicle body parts.

Uniform retention of the lamp in the opening may, for example, be achieved by providing several fastening arrangements with associated spring members. In this way, adequate retention will always be provided independently of the direction of deformation of the vehicle parts.

The spring member is preferably a strip material formed into folds and the ends of the strip extend substantially perpendicularly to the direction of spring displacement. This assures good introduction of forces into the spring member and also that the strip material can be fastened to the vehicle part and/or to the lamp by a special arrangement.

In one embodiment the fastening arrangement includes a cavity in which the strip material is supported. In that case, the fastening arrangement may be economically produced as a one-piece injection molding. The desired mechanical properties can then be provided by the inlaid strip material.

The use of strip material for the spring member has the additional advantage that, when the fastening arrangement is fastened to the inlaid strip material by a screw connection, the strip material will resist the turning torque that is applied to the screw connection during fastening. The fastening arrangement with the strip material is thus subjected to little or no twisting while the screw connection is being fastened. If the spring member were, for example, a coil spring, the mounting of the spring would have to be especially arranged to prevent the spring from twisting during fastening. This is rendered superfluous by the use of strip material as a spring member.

The entering direction of the threads of the screw connection may advantageously extend substantially parallel to the spring displacement direction of the spring member. Then the same fastening device can be simply used even in the case of inaccuracies of manufacture or for different vehicle types. All that is necessary for the fastening is that the threads and the screw connection partially engage each other. The proper retaining force for the mounting arrangement can then be generated by tightening of the screw connection and corresponding expansion of the spring member.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
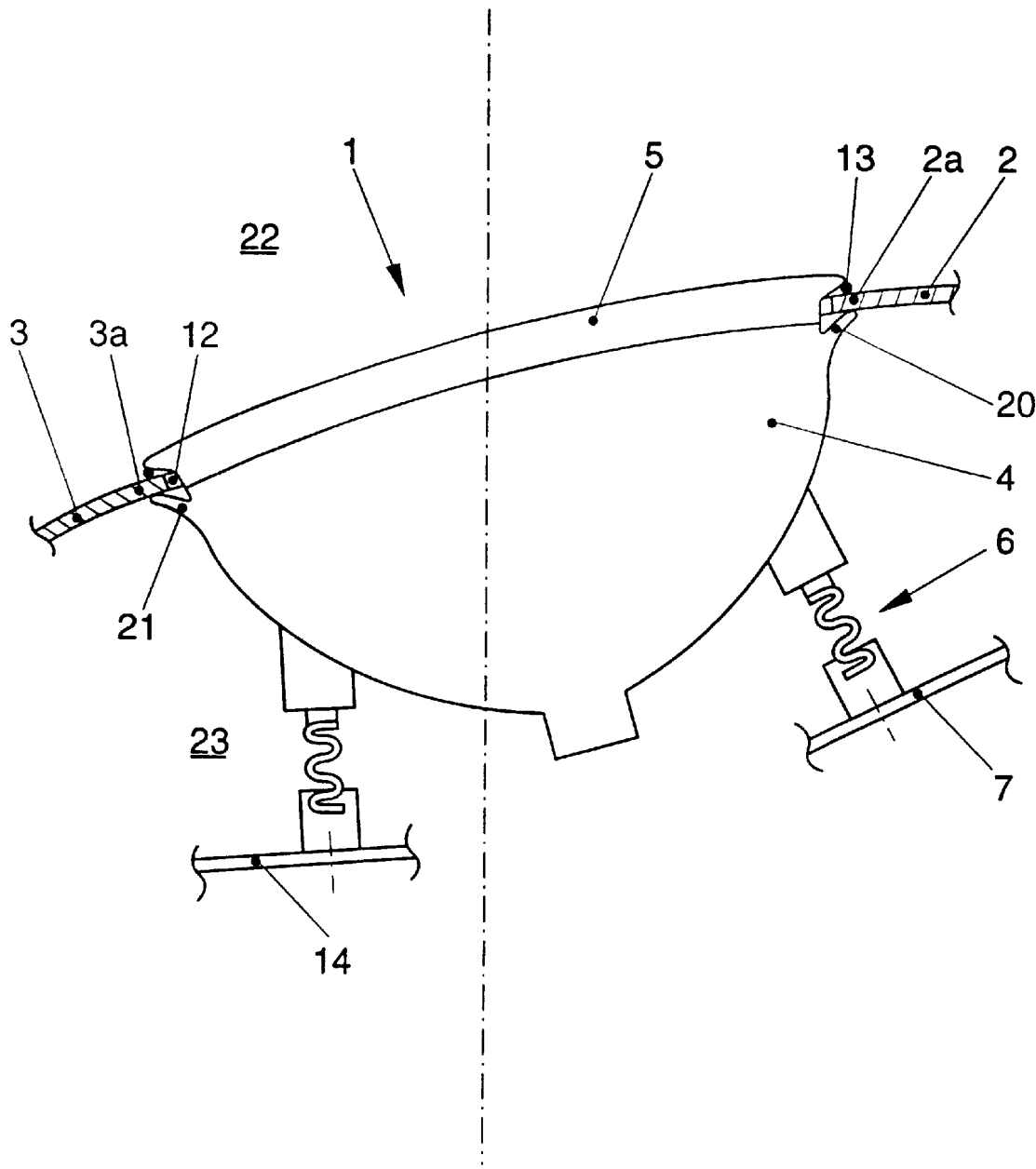
FIG. 1 is a fragmentary view, partly in section, showing a representative embodiment of an arrangement for mounting a lamp in an opening formed by two body parts in accordance with the invention.
Figure 3:
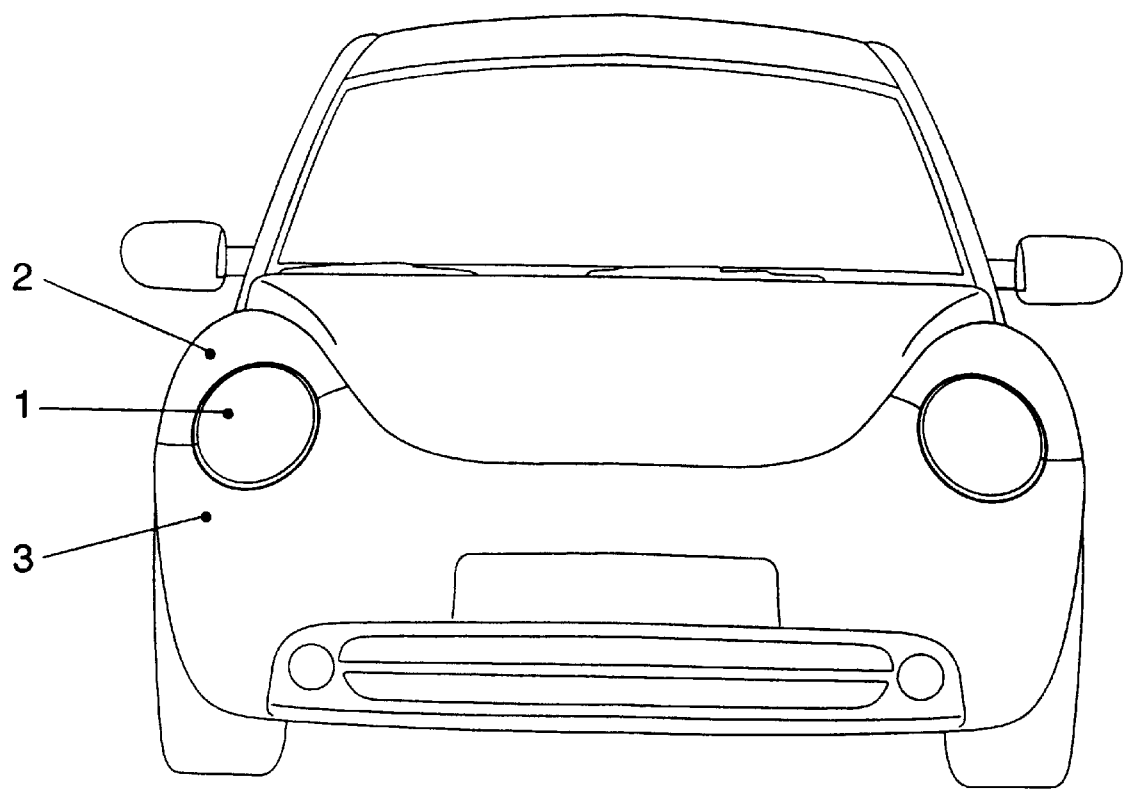
FIG. 3 is a front view of a vehicle containing lamps mounted in accordance with the invention.

In the typical embodiment of the invention shown in FIGS. 1 and 3, a headlamp is mounted in an opening 12 formed by two vehicle body parts 2 and 3. The parts 2 and 3 are a fender and a bumper mounting. The bumper 3 consists of a plastic, for example EPDM, and the fender is made of sheet metal. Upon an increase of temperature or under applied stress, the two parts will deform differently because of the different properties of the two materials. The lamp 1 has a housing 4 and a lens 5 which overlaps the outer surfaces of the edges 2a and 3a of the body parts 2 and 3 at least segmentally from the outside 22 of the vehicle. On the inside 23 of the vehicle, two catch elements 20 and 21 engage the inner surfaces of the edges 2a and 3a. The edges 2a and 3a are thus clamped between the catch elements 20 and 21 and the part of the lens 5 which overlaps the edges on the outside of the vehicle so that the lamp 1 is secured to the two body parts 2 and 3.

At least one of the catch elements 20 and 21 is resilient. If the other catch element is rigid, then the edge 2a or 3a is first inserted between the rigid catch element and the lens 5, and then the lamp 1 is pivoted inwardly to cause engagement of the resilient catch element behind the corresponding edge of the body part. If deformations of the parts 2 and 3 occur after the lamp has been mounted, the lamp will adapt to them, thereby securely avoiding gaps between lamp and the body parts. A sealing member 13 is provided between the lens 5 and the outer surfaces of the body parts 2 and 3. In addition, fastening arrangements 6 are provided between the housing 4 and two vehicle parts 7 and 14 to retain the lamp 1 in the opening.

Figure 2:
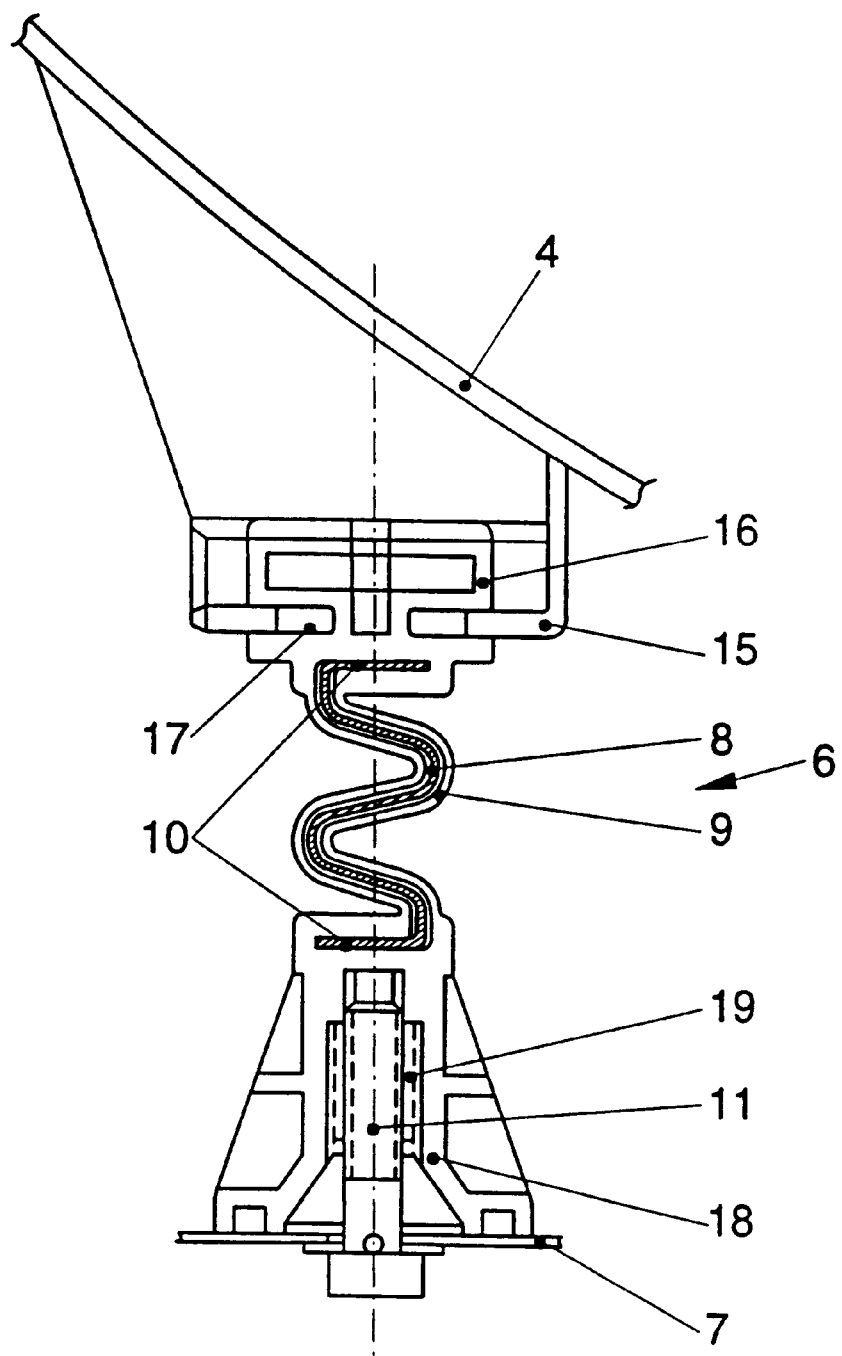
FIG. 2 is an enlarged fragmentary view showing a fastening arrangement with a spring member mounted therein.

FIG. 2 shows a fastening arrangement 6 including a spring member 8 having one end 16 mounted in the housing 4. For this purpose, the fastening arrangement 6 has two recesses 17 in which corresponding projections 15 of the housing 4 are received. The end 16 may, for example, have a rectangular configuration so as to prevent rotation relative to the housing 4. In the other end 18 of the fastening arrangement 6, which is connected to the vehicle part 7, a thread 19 is formed. The fastening arrangement 6 is then mounted on the vehicle part 7 by introducing a screw 11 into an opening in the vehicle part 7 and screwing it into the thread 11. Between the two ends 16 and 18, the fastening arrangement 6 is hollow and the strip material acting as a spring member 8 is inserted into a cavity provided by the hollow part. The strip material 8 is formed in folds between its ends 16 and 18 and has end portions 10 which extend perpendicular to the direction of spring action. The strip material 8 may be dimensioned according to the desired mechanical properties of the fastening arrangement 6 to absorb the tension or compression, as the case may be, acting between the housing 4 and the vehicle part 7.

With this arrangement, if the body parts 2 and 3 deform differently, for example because of different expansion of the materials upon heating, then the differential deformation is compensated by the spring member 8. The lamp 1 is retained in a floating manner in the opening 12 of the body parts 2 and 3 by the spring member 8 and even in different positions of the body parts 2 and 3, the lamp will remain in close contact with the edges of the parts 2 and 3. Any remaining gaps are covered by the sealing element 13.

The direction of motion of the screw 11 into the thread 19 is parallel to the direction of spring action of the strip member 8. When the screw 11 is screwed into the thread 19, the resistance of the spring member 8 to twisting acts against the tightening torque of the screw. Hence, the spring member 8 undergoes little or no rotation as the screw 11 is tightened.

The same fastening arrangement 6 may be used for different vehicle types. Moreover, the fastening arrangement 6 is capable of compensating for manufacturing tolerances since the same fastening arrangement 6 can be used with different spacings between housing 4 and the vehicle part 7. For that purpose, the end 16 of the fastening arrangement 6 is first fastened to the projection 15 and the other end 18 is then fastened to the vehicle part 7 using the screw 11. The end 18 is then drawn up against the vehicle part 7 by simply tightening the screw 11. The spring member 8 may thus be elongated to a different extent and a sufficient retaining force is exerted by the spring member 8 on the lamp 1 even with different elongations.

While the occurrence of gaps between the bodywork parts 2 and 3 and the lamp 1 is securely prevented both by the spring action of the spring member 8 and by the clamp-like attachment of the lamp 1 by the catch elements 20 and 21, each of those two fastening arrangements offers advantages of its own. Gap widths can be further minimized by combining the two arrangements. The spring action generated by the spring member urges the lens and housing, against the body parts 2 and 3 in an area overlapping the edges 2a and 3a. Besides the necessary fastening force, the pressure on the sealing element 13 helps to seal the opening. Attachment by the catch elements 20 and 21 makes it possible for the lamp 1 to be held in the opening 12 without gaps even under extraordinary loads or in case of damage to the spring member 8.

Although the invention has been described herein with reference to specific embodiments, many modifications and variations therein will readily occur to those skilled in the art. Accordingly, all such variations and modifications are included within the intended scope of the invention.

I claim:

1. An arrangement for mounting a lamp to at least one vehicle part comprising:

an opening formed by at least two vehicle body parts;

a lamp received in the opening;

and mounting means retaining the lamp in the opening by spring forces which are exerted between the vehicle parts and the body parts forming the opening by a spring means comprising a strip of material formed in folds and associated with the at least one vehicle part and with fastening means on the lamp.

2. An arrangement according to claim 1 wherein the opening has an edge and including sealing means between the lamp and the edge of the opening.

3. An arrangement according to claim 1 wherein at least two of the body parts and the vehicle parts are made of different materials and the spring forces provided by the mounting means are able to compensate for differential deformations of the parts.

4. An arrangement according to claim 1 wherein the fastening means has a cavity and the strip of material formed in folds is positioned in the cavity of the fastening means.

5. An arrangement according to claim 1 wherein the strip of material formed in folds has ends which extend substantially perpendicularly to a direction of spring action.

6. An arrangement according to claim 1 wherein the fastening means is rotationally fixed on at least one of the lamp and a vehicle part and is retained by a screw connection.

7. An arrangement according to claim 6 wherein the displacement of the threads of the screw connection is substantially parallel to a direction of spring action of the spring means.

8. An arrangement according to claim 1 including catch elements on the lamp and wherein the lamp overlaps edge parts of the body parts on a surface toward an outside of the vehicle and wherein the catch elements engage the edge parts of the body parts on a surface toward an inside of the vehicle, so that the edge parts are clamped between the catch elements and the lamp.

9. An arrangement for mounting a lamp in an opening formed by at least two body parts of a vehicle comprising a lamp having catch elements and wherein the lamp overlaps edges of the body parts on one surface, and wherein the catch elements engage the edges on an opposite surface so that the edges are clamped between the catch elements and the lamp and spring means for mounting the lamp to at least one vehicle part wherein the spring means is a strip material formed in folds.

10. An arrangement according to claim 9 wherein the body parts and the vehicle parts consist of different materials, and wherein the spring means can compensate for differential deformations of the body parts and the vehicle parts.

11. An arrangement according to claim 9 wherein the strip material has end parts which extend substantially perpendicular to a direction of spring action.

12. An arrangement according to claim 11 including a sealing means between the lamp and an edge of the opening.

* * * * *

UNITED STATES PATENT AND TRADEMARK OFFICE
CERTIFICATE OF CORRECTION

PATENT NO. : 5,904,416

DATED : May 18, 1999

INVENTOR(S) : Michael Müller

It is certified that error appears in the above-identified patent and that said Letters Patent is hereby corrected as shown below:

Column 1, line 24, "disclose" should read -- discloses --;

Column 4, line 66, "of spring" should read -- of the spring --.

Signed and Sealed this

Twelfth Day of September, 2000

Attest:

Q. TODD DICKINSON

Attesting Officer                    Director of Patents and Trademarks